United States Patent
Okumura et al.

(10) Patent No.: US 8,951,490 B2
(45) Date of Patent: Feb. 10, 2015

(54) $CO_2$ RECOVERY METHOD AND APPARATUS

(75) Inventors: Takeshi Okumura, Kakogawa (JP); Yoshiharu Nonaka, Kobe (JP); Tomoyuki Ogino, Kobe (JP); Takatoshi Shoji, Kobe (JP); Masatoshi Hirokawa, Kobe (JP); Noboru Takikawa, Machida (JP); Kazuto Kamazawa, Wako (JP)

(73) Assignee: Kawaski Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/123,408

(22) PCT Filed: May 18, 2012

(86) PCT No.: PCT/JP2012/003275
§ 371 (c)(1),
(2), (4) Date: Dec. 20, 2013

(87) PCT Pub. No.: WO2012/164856
PCT Pub. Date: Dec. 6, 2012

(65) Prior Publication Data
US 2014/0105809 A1 Apr. 17, 2014

(30) Foreign Application Priority Data
May 31, 2011 (JP) ................................. 2011-122535

(51) Int. Cl.
*C01B 31/20* (2006.01)
*B01D 53/04* (2006.01)
(Continued)

(52) U.S. Cl.
CPC ................ *C01B 31/20* (2013.01); *B01D 53/04* (2013.01); *B01D 53/047* (2013.01); *B01D 53/62* (2013.01);
(Continued)

(58) Field of Classification Search
USPC .................. 423/220, 228, 229; 422/168, 187
See application file for complete search history.

(56) References Cited

U.S. PATENT DOCUMENTS

| 5,339,633 | A | * | 8/1994 | Fujii et al. | ........................ 60/648 |
| 5,344,627 | A | * | 9/1994 | Fujii et al. | ..................... 423/220 |
| 7,022,168 | B2 | * | 4/2006 | Schimkat et al. | ............... 96/125 |

FOREIGN PATENT DOCUMENTS

| JP | A-61-254221 | 11/1986 |
| JP | A-63-252528 | 10/1988 |

(Continued)

OTHER PUBLICATIONS

2007-Year Corrective Action Projects about Carbon Dioxide Immobilization/Effective-Utilization, and Others, Reports on Results of "Carbon Dioxide Separation and Recovery Technique Development by Utilizing Low-grade Waste Heat," *Juridical Foundation of Research Institute of Innovative Technology for the Earth*, Mar. 2008, p. 21 (with partial translation).

(Continued)

*Primary Examiner* — Timothy Vanoy
(74) *Attorney, Agent, or Firm* — Oliff PLC

(57) ABSTRACT

A $CO_2$ recovery method and apparatus for desorbing and recovering carbon dioxide with low energy consumption from a gas discharged from a power generation plant having a boiler and a steam turbine. The adsorption and the desorption of carbon dioxide are performed alternately in two $CO_2$ absorbers and located in a $CO_2$ recovery apparatus, which each hold a carbon dioxide adsorbent. When carbon dioxide is desorbed, steam discharged from an outlet of a steam turbine of a power generation plant is partially branched before introduced into a condenser, and sent to a steam compressor. The partially branched steam is compressed in this compressor, and then sent to a cooling device. By cooling, the steam for desorption is prepared. The steam prepared in the cooling device is supplied into a $CO_2$ absorber to desorb carbon dioxide. Accordingly, waste steam, before it is introduced into the condenser, is usable for desorption.

10 Claims, 6 Drawing Sheets

(51) Int. Cl.
*B01D 53/047* (2006.01)
*B01D 53/62* (2006.01)

(52) U.S. Cl.
CPC ... *B01D 2257/504* (2013.01); *B01D 2258/0283* (2013.01); *B01D 2259/40001* (2013.01); *B01D 2259/40054* (2013.01); *B01D 2259/40086* (2013.01); *B01D 2259/402* (2013.01); *Y02C 10/08* (2013.01)

USPC ........... 423/220; 423/228; 423/229; 422/168; 422/187

(56) References Cited

FOREIGN PATENT DOCUMENTS

| | | | |
|---|---|---|---|
| JP | 5-96131 A | * 4/1993 | ............ 423/220 |
| JP | A-11-335680 | 12/1999 | |
| JP | A-2007-61777 | 3/2007 | |
| JP | A-2010-69398 | 4/2010 | |
| WO | WO 2011/013332 A1 | 2/2011 | |

OTHER PUBLICATIONS

International Search Report issued in International Patent Application No. PCT/JP2012/003275 mailed Aug. 14, 2012.

* cited by examiner

$CO_2$ RECOVERY METHOD AND APPARATUS

TECHNICAL FIELD

The present invention relates to a $CO_2$ recovery method and apparatus, and in particular to a $CO_2$ recovery method and apparatus capable of recovering carbon dioxide with low energy consumption from a gas to be processed that is discharged from a power generation plant equipped with a boiler and a steam turbine and that contains carbon dioxide.

BACKGROUND ART

The reduction in the discharge volume of carbon dioxide known as global warming gas is a theme on a global scale. While solar energy, wind power, geothermal energy and others have been developed, development and demonstration tests have been internationally advanced about a technique of separating and recovering carbon dioxide in a combustion exhaust gas discharged when fossil fuels such as coal are used, and then accumulating recovered carbon dioxide in the ground. In particular, about facilities from which a large volume of carbon dioxide is emitted, such as thermal power generation plants, it is necessary to develop a technique of separating and recovering carbon dioxide on a large scale.

In such facilities, such as thermal power generation plants, studies have been made about a technique of using an amine compound to absorb carbon dioxide selectively to separate and recover carbon dioxide in exhaust gas. In this recovery technique, a heat source is required when carbon dioxide is separated and recovered from the amine compound. For this heat source for carbon dioxide separation and recovery, the use of steam generated from boilers of thermal power generation plants has been so far studied (Patent Literature 2).

FIG. 6 schematically illustrates a power generation plant, and a conventional carbon dioxide separation and recovery apparatus installed together therewith. As illustrated in FIG. 6, in this plant, which is a power generation plant 1, steam generated by a boiler 3 is introduced into a steam turbine 4 to rotate a power generator 5, thus generating electric power. The steam that has been finished a work thereof in the steam turbine 4 is condensed in a condenser (steam condenser) 6, and then returned again to the boiler 3. In the meantime, a combustion exhaust gas from the boiler 3 is cooled, and then supplied to an absorption tower 7 of an apparatus 2, which is the carbon dioxide separation and recovery apparatus, from the downside thereof. In this tank, the gas is brought into contact with an aqueous solution of amines, such as monoethanolamine, which are carbon dioxide absorbents for recovering carbon dioxide, at, for example, 40° C. The combustion exhaust gas from which the recovery of carbon dioxide has been finished is sent from the top of the absorption tower 7 to a chimney 11, and then discharged into the atmosphere. The aqueous amine solution in which carbon dioxide has been absorbed is sent to a regeneration tank 8, and carbon dioxide is desorbed and recovered from the aqueous amine solution in this regeneration tank 8. The desorption and recovery of carbon dioxide is attained by heating the aqueous amine solution to 120° C. At this time, steam is used as a heat source which has a high temperature of 120° C. or higher and has been bled from the steam turbine 4 of the power generation plant 1, as represented by an arrow 12. The high-temperature steam, which has been bled from the steam turbine 4, is supplied to a heat exchanger 9. By effect of a heated medium generated by heat exchange therein, carbon dioxide is desorbed and recovered from the aqueous amine solution in the regeneration tank 8.

It is known that in the conventional carbon dioxide separation and recovery apparatus 2, a large calorie, such as a calorie of 2.5 to 4.0 GJ/ton of $CO_2$, is required for the desorption of carbon dioxide (Nonpatent Literature 1). When steam having the calorie required for the desorption is bled from the steam turbine 4, a problem is caused that the power generation amount in the power generation plant 1 is decreased.

Outlet steam generated in the boiler 3 is inflated at the final stage of the steam turbine 4. Thereafter, the outlet steam turns low in temperature and pressure. The low-temperature and low-pressure steam still has thermal energy latently. However, the steam is returned to water in the condenser without attaining any work actually. Accordingly, if the low-temperature and low-pressure steam is taken outside the boiler system and then compressed to be raised in temperature, the steam can be effectively used. Actually, however, the steam emits latent heat thereof in the condenser 6 at the downstream to be returned to a liquid (water). Thus, it is desired to use the low-temperature and low-pressure steam effectively. In the conventional carbon dioxide separation and recovery apparatus 2 illustrated in FIG. 6, the aqueous amine solution is used as a medium for capturing carbon dioxide. However, the same problem is caused in a carbon dioxide separation apparatus using an adsorbent in which an amine compound is carried on solid particles (Patent Literature 1).

CITATION LIST

Patent Literatures

PTL 1: International Publication No. WO 2011/013332
PTL 2: Japanese Laid-Open Patent Application Publication No. 2007-61777

Nonpatent Literature

NPL 1: 2007-Year Corrective Action Projects about Carbon Dioxide Immobilization/Effective-Utilization, and Others, Report on Results of "Carbon Dioxide Separation and Recovery Technique Development by Utilizing Low-grade Waste Heat", March in 2008, p. 21, Juridical Foundation of Research Institute of Innovative Technology for the Earth

SUMMARY OF INVENTION

Technical Problem

An object of the present invention is to solve the above-mentioned problems in the prior art. Specifically, an object of the invention is to provide a $CO_2$ recovery method and apparatus capable of desorbing and recovering carbon dioxide with low energy consumption from a gas to be processed that is discharged from a power generation plant equipped with a boiler and a steam turbine and that contains carbon dioxide.

Solution to Problem

The $CO_2$ recovery method of the invention is a $CO_2$ recovery method, using a carbon dioxide adsorbent to adsorb and desorb carbon dioxide from a gas to be processed that is discharged from a power generation plant having a boiler and a steam turbine, and that contains carbon dioxide, including: an adsorbing step of using the carbon dioxide adsorbent to adsorb carbon dioxide from the gas to be processed; and a desorbing step of using steam for desorption to desorb, from the carbon dioxide adsorbent which has adsorbed carbon dioxide, carbon dioxide, wherein the steam for desorption is prepared from a part of outlet steam discharged from an outlet of the steam turbine.

The $CO_2$ recovery apparatus of the invention is a $CO_2$ recovery apparatus, using a carbon dioxide adsorbent to adsorb and desorb carbon dioxide from a gas to be processed that is discharged from a power generation plant having a boiler and a steam turbine, and that contains carbon dioxide, including: at least one $CO_2$ absorber filled with the carbon dioxide adsorbent; gas-to-be-processed supplying means for supplying the gas to be processed, which contains carbon dioxide, to the $CO_2$ absorber to cause carbon dioxide to be adsorbed to the carbon dioxide adsorbent; steam-for-desorption preparing means for preparing steam for desorption that is steam for desorbing carbon dioxide; and steam-for-desorption supplying means for supplying the steam for desorption to the $CO_2$ absorber to desorb carbon dioxide from the carbon dioxide adsorbent, wherein the steam-for-desorption preparing means is means for preparing, from a part of outlet steam discharged from an outlet of the steam turbine, the steam for desorption.

As described above, in the $CO_2$ recovery method and apparatus, the steam for desorption is prepared from the part of the outlet steam discharged from the outlet of the steam turbine, therefore, carbon dioxide can be desorbed and recovered without lowering the power generation amount of the power generation plant.

It is preferred that the desorption of carbon dioxide is performed under a negative pressure. This is because the outlet steam discharged from the outlet of the steam turbine is usually low in temperature and pressure.

In the $CO_2$ recovery method and apparatus, it is allowable that the part of the outlet steam discharged from the outlet of the steam turbine is compressed/raised in temperature, and steam present after this compressing/temperature-raising step is used to prepare the steam for desorption. In this case, the steam for desorption that is prepared by the use of the steam present after the compressing/temperature-raising step is preferably saturated steam having a pressure of 7 to 70 kPa. By compressing the part of the outlet steam discharged from the outlet of the steam turbine and raising the part in temperature in this way, steam having a temperature suitable for the preparation of the steam for desorption can be gained.

The steam for desorption may be prepared from water by heat exchange between the water and the steam present after the compressing/temperature-raising step. This manner makes it possible to desorb and recover carbon dioxide without giving any bad effect to the power generation plant by returning the steam or water after the heat exchange to the power generation plant.

The steam for desorption may be prepared by injecting water to the steam present after the compressing/temperature-raising step. In this case, no heat exchange is required so that the $CO_2$ recovery apparatus can be made simple.

When the carbon dioxide adsorbent is an amine-supported adsorbent in the $CO_2$ recovery method and apparatus, it is allowable that the steam for desorption is supplied from an end of the carbon dioxide adsorbent to a different end thereof, and the supply of the steam for desorption is stopped when the temperature of the different end of the carbon dioxide adsorbent reaches a predetermined temperature. This manner makes it possible to use the steam for desorption effectually without any waste.

Advantageous Effects of Invention

The use of the $CO_2$ recovery method and apparatus of the invention makes it possible to utilize, as a heat source for desorbing and recovering carbon dioxide, calorie contained in the outlet steam in the steam turbine, the calorie having been discarded without being used in the prior art. Thus, carbon dioxide can be desorbed and recovered without decreasing the power generation amount of the power generation plant. When the outlet steam from the outlet of the steam turbine is compressed/raised in temperature and the resultant steam is used, the resultant energy of the steam (energy usable for desorbing and recovering $CO_2$) can be made large relatively to energy necessary for the compression. Furthermore, the decrease is made in the load of condensation of a condenser (steam condenser) for condensing the outlet steam discharged from the outlet of the steam turbine of the power generation plant.

DESCRIPTION OF EMBODIMENTS

Figure 1:
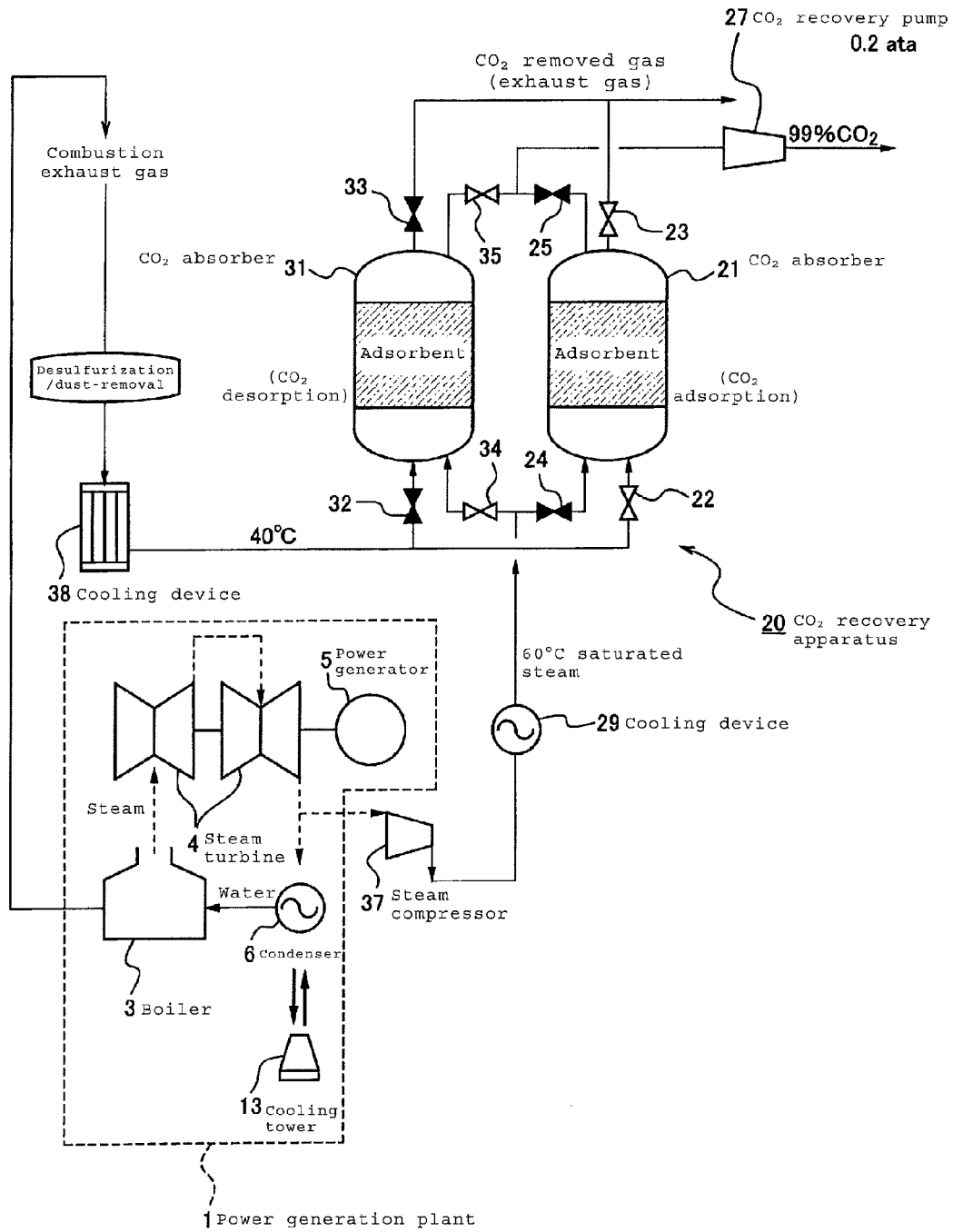
FIG. 1 is a schematic structural view of a $CO_2$ recovery apparatus according to an embodiment of the invention, and a power generation plant.

With reference to the drawings, embodiments of the invention will be described hereinafter. However, the invention is not limited by the following description. FIG. 1 schematically illustrates the structure of a $CO_2$ recovery apparatus 20 according to an embodiment of the invention, and a power generation plant 1. The power generation plant 1 is equipped with a boiler 3 in which fossil fuels such as coal are combusted to generate steam, a steam turbine 4 for rotating a power generator 5, using the steam generated in the boiler 3, and a condenser (steam condenser) 6 for condensing the steam that has finished the rotation of the steam turbine 4. Water liquefied by the condensation in the condenser 6 is again returned to the boiler 3. To the condenser 6 is supplied cooling-water circulating between the condenser 6 and a cooling tower 13.

In the $CO_2$ recovery apparatus 20 of the present embodiment, carbon dioxide is adsorbed from a combustion exhaust gas generated in the boiler 3 of the power generation plant 1, and then desorbed and recovered. The $CO_2$ recovery apparatus 20 of the embodiment is equipped with two $CO_2$ absorbers 21 and 31 in each of which a carbon dioxide adsorbent which carbon dioxide is adsorbed on and desorbed from is held. From the combustion exhaust gas discharged from the boiler 3 of the power generation plant 1, sulfur and dust are removed, and then the gas is cooled to about 40° C. in a cooling device 38. The cooled combustion exhaust gas is supplied to either one of the two $CO_2$ absorbers 21 and 31 to adsorb carbon dioxide from the gas. The carbon dioxide adsorbent used in the embodiment is a carbon dioxide adsorbent on which an amine compound such as monoethanolamine or diethanolamine is carried.

A valve 22 for switching on or off the supply of the combustion exhaust gas sent from the cooling device 38 is fitted to a line for connecting the tank 21, which is one of the two $CO_2$ absorbers, and the cooling device 38 to each other. To the upside of the $CO_2$ absorber 21 is fitted a valve 23 for discharging the combustion exhaust gas from which the adsorption of carbon dioxide has been finished in a period for the adsorption of carbon dioxide. To the upside of the $CO_2$ absorber 21 is also fitted a valve 25 for recovering carbon dioxide that has been desorbed in a period for the desorption of carbon dioxide. Similarly, a valve 32 for switching on or off the supply of the combustion exhaust gas sent from the cooling device 38 is fitted to a line for connecting the tank 31, which is the other $CO_2$ absorber, and the cooling device 38 to each other. To the upside of the $CO_2$ absorber 31 is fitted a valve 33 for discharging the combustion exhaust gas from which the adsorption of carbon dioxide has been finished in the period for the adsorption of carbon dioxide. To the upside of the $CO_2$ absorber 31 is also fitted a valve 35 for recovering carbon dioxide that has been desorbed in the period for the desorption of carbon dioxide. Furthermore, the embodiment is equipped with a carbon dioxide recovery pump 27 for recovering, through the valve 25 or the valve 35, carbon dioxide which has been desorbed from the $CO_2$ absorber 21 or 31.

The $CO_2$ recovery apparatus 20 of the invention is further equipped with a steam compressor 37 and a cooling device 29 for making use of outlet steam from the steam turbine 4 (the so-called turbine exhaust gas). In other words, the $CO_2$ recovery apparatus 20 of the present embodiment is formed in such a manner that outlet steam discharged from the outlet of the steam turbine 4 of the power generation plant 1 is partially branched before introduced into the condenser 6, so as to be sent to the $CO_2$ recovery apparatus 20. The partially branched steam is sent to the steam compressor 37, compressed/raised in temperature in this compressor, and then sent to the cooling device 29. By cooling, in the cooling device 29, the steam compressed/raised in temperature, steam for desorption is prepared. When carbon dioxide is desorbed, the steam prepared in the cooling device 29 is supplied through the valve 24 or 34 to the $CO_2$ absorber 21 or 31.

In FIG. 1, the valves 22 and 23 arranged, respectively, over and under the tank 21, which is one of the $CO_2$ absorbers, are opened while the valves 32 and 33 arranged, respectively, over and under the tank 31, which is the other $CO_2$ absorber, are closed. Thus, in the $CO_2$ absorber 21, carbon dioxide from the combustion exhaust gas is adsorbed. Moreover, the valves 24 and 25 at the $CO_2$ absorber 21 side are closed while the valves 34 and 35 at the $CO_2$ absorber 31 side are opened. Thus, carbon dioxide is desorbed in the $CO_2$ absorber 31. In the case of adsorbing carbon dioxide of the combustion exhaust gas in the $CO_2$ absorber 31 and further desorbing carbon dioxide in the $CO_2$ absorber 21, the valves 22 and 23 are closed, the valves 32 and 33 are opened, the valves 24 and 25 are opened and the valves 34 and 35 are closed.

Figure 5:
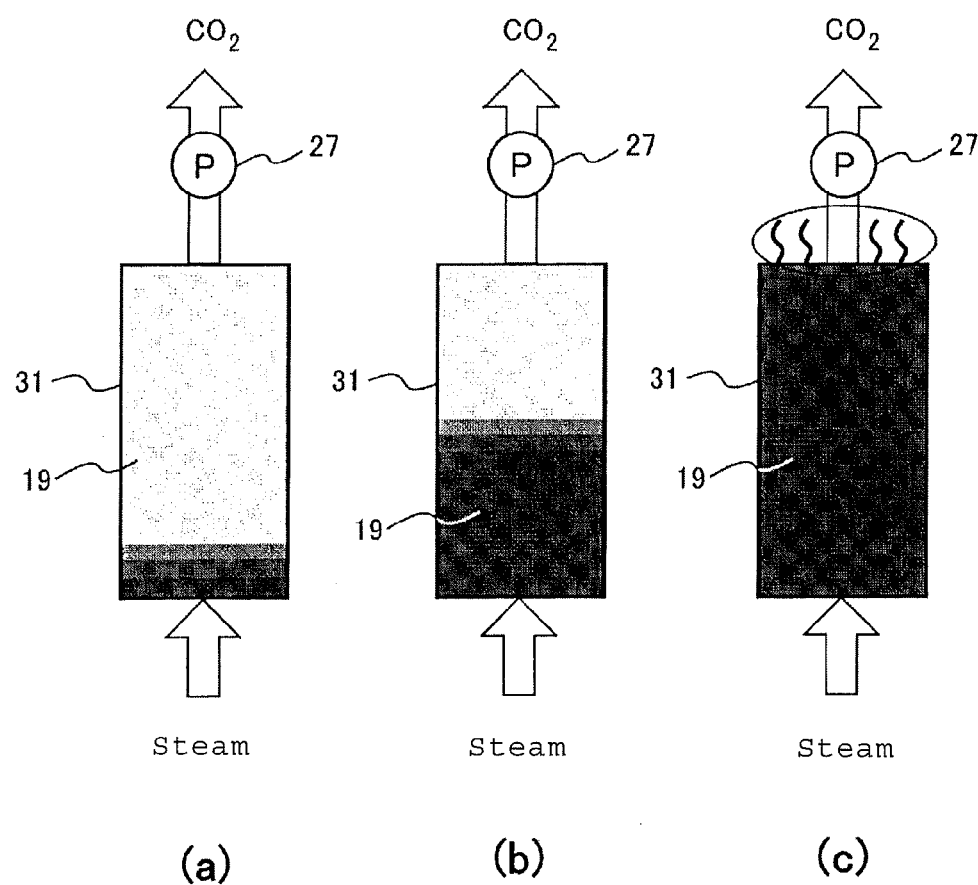
FIGS. 5(a) to 5(c) are explanatory views illustrating a situation that a portion where carbon dioxide is desorbed shifts when steam is supplied to a carbon dioxide adsorbent made of an amine-supported adsorbent.

Herein, referring to FIGS. 5(a) to 5(c), description is made about a phenomenon observed in the carbon dioxide adsorbent, which is made of an amine-supported adsorbent, when steam for desorption is supplied to the carbon dioxide adsorbent to desorb carbon dioxide. As illustrated in FIG. 5(a), in the case of starting the supply of the steam for desorption to the carbon dioxide adsorbent 19, which is filled into the $CO_2$ absorber 31, from the downside (one of the two ends) of the carbon dioxide adsorbent 19, the steam is condensed in the lowermost layer of the carbon dioxide adsorbent 19 so that the layer rises in temperature. In this way, carbon dioxide adsorbed in this layer is desorbed. When the supply of the steam is further continued, the steam is condensed in a lamellar portion positioned slightly upward from the lowermost portion to be lower in temperature (than the latter portion). From this portion, carbon dioxide is desorbed. In such a way, in the carbon dioxide adsorbent 19, a lamellar portion in which the steam is condensed successively shifts upward. Following this shift, the desorption of carbon dioxide advances (FIG. 5(b)). Carbon dioxide that has been desorbed slowly shifts upward inside the carbon dioxide adsorbent 19 so that the concentration thereof is gradually heightened. Finally, the concentration of carbon dioxide in the gas discharged from the carbon dioxide recovery pump 27 turns to about 100%. As described herein, the lamellar portion in which carbon dioxide is desorbed reaches the top (the other end) of the carbon dioxide adsorbent 19 so that the temperature thereof rises to a predetermined temperature (FIG. 5(c)). From this moment, the desorption amount of carbon dioxide is abruptly lowered. Finally, the volume of carbon dioxide in the gas discharged from the carbon dioxide recovery pump 27 turns to about 0.

The adsorption/desorption heat of carbon dioxide is theoretically about 1.7 $MJ/CO_2$-kg. However, the condensation heat of steam is about 2.3 MJ/steam-kg. Thus, the steam amount necessary for discharging 1.0 kg of $CO_2$ is 0.74-kg-steam/$CO_2$-kg as also shown below.

(1.7 $MJ/CO_2$-kg)/(2.3 MJ/steam-kg)=0.74-kg-steam/$CO_2$-kg

When this is represented in terms of volume, the following conclusion is obtained: about steam, 1.24 $Nm^3$/steam-kg is satisfied while about $CO_2$, 0.51 $Nm^3/CO_2$-kg is satisfied; thus, the amount by volume of the necessary steam is as follows: 1.80-$Nm^3$-steam/$CO_2$-$Nm^3$.

(0.74-kg-steam×1.24 $Nm^3$/steam-kg)/(1.0-kg-$CO_2$×0.51 $Nm^3/CO_2$-kg)=(1.80-$Nm^3$-steam/$CO_2$-$Nm^3$)

In the present embodiment, attention is paid to this phenomenon, which is caused when carbon dioxide is desorbed; thus, a control device (not illustrated) is set up for making a control to stop the supply of the steam for desorption when the top (the other end) of the carbon dioxide adsorbent 19 reaches a predetermined temperature. The setup of this control device makes it possible to remove a waste of the steam for desorption.

Figure 2:
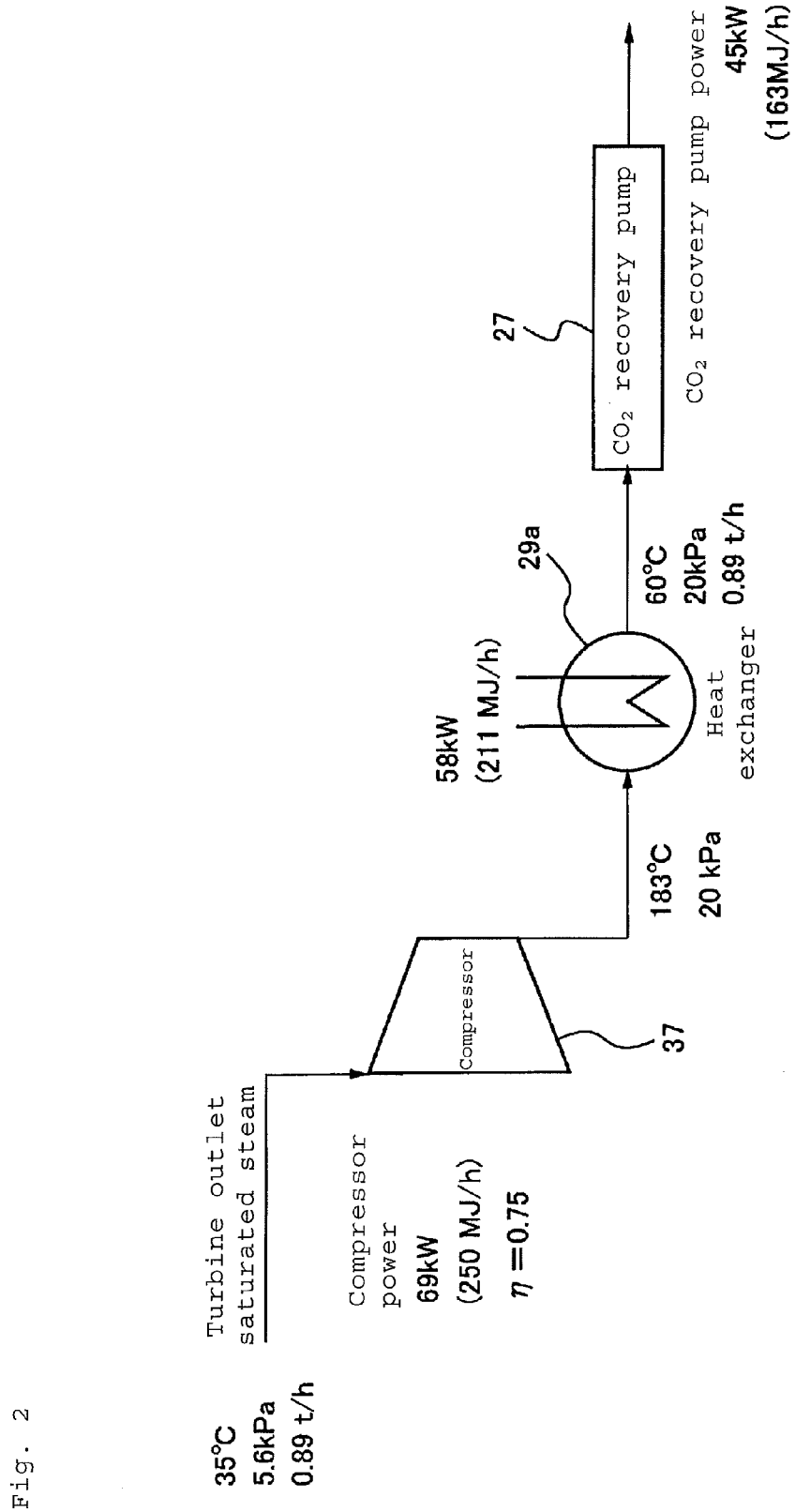
FIG. 2 is a schematic chart showing an energy balance when a heat exchanger is used as a cooling device in the $CO_2$ recovery apparatus in FIG. 1.

FIG. 2 is an explanatory chart showing an energy balance in the recovery of carbon dioxide when a heat exchanger 29a is used as the cooling device 29 in FIG. 1. FIG. 2 demonstrates a case where carbon dioxide is recovered at 1 t/h. As described with reference to FIG. 1, the outlet steam to be sent from the outlet of the steam turbine 4 to the condenser 6 is partially taken out and sent to the steam compressor 37. The outlet steam before introduced into the condenser 6 is in general saturated steam having a low temperature and a low pressure. In the example illustrated in FIG. 2, saturated steam of 35° C. in temperature and 5.6 kPa in pressure is taken out at 0.89 t/h.

Saturated steam having such a low temperature and low pressure is not used in any conventional power generation plant. The steam is returned to water in the condenser 6 without attaining any work. In the present embodiment, this low-temperature and low-pressure saturated steam is compressed in the steam compressor 37 to be raised in pressure, so as to satisfy steam conditions suitable for the adsorption/desorption of carbon dioxide. In FIG. 2, the saturated steam is raised in pressure until the steam turns to overheated steam of 183° C. in temperature and 20 kPa in pressure. At this time, the power necessary for the steam compressor 37 is 69 kW. By cooling this through the heat exchanger 29a, target saturated steam, 60° C. in temperature and 20 kPa in pressure, is obtained as steam for desorption. The supply amount of this steam for desorption is 0.89 t/h. This saturated steam is supplied to the adsorbent-filled tower 21 or 31 illustrated in FIG. 1, and used to desorb carbon dioxide. Furthermore, carbon dioxide desorbed inside the adsorbent-filled tower 21 or 31 is kept under a reduced pressure. Thus, in order to take out this gas as a normal-pressure gas, a power of 45 kW is required in the carbon dioxide recovery pump 27.

The description is made about the power for recovering carbon dioxide herein. As described above, steam for desorbing (regenerating) carbon dioxide causes low-temperature steam in the outlet of the steam turbine to be compressed so that the low-temperature steam is raised in temperature and pressure to satisfy steam conditions suitable for the adsorption/desorption of carbon dioxide. In FIG. 2, the pressure of steam in the turbine outlet is 5.6 kPa. When the steam is supplied, as it is, to the adsorbent, no power for compressing the steam is required. However, the pressure of carbon dioxide (100%) discharged from this turbine is also 5.6 kPa. Thus, in order to recover carbon dioxide outside the system, it is necessary to use a carbon dioxide recovery pump to compress carbon dioxide from 5.6 kPa to the atmospheric pressure (100 kPa). Reversely, if the turbine outlet steam is compressed to the atmospheric pressure (100 kPa) and supplied to the adsorbent, carbon dioxide to be discharged (100%) also has the atmospheric pressure (100 kPa) so that discharged carbon dioxide can be recovered, as it is, without using any carbon dioxide recovery pump. When the regeneration temperature (pressure) is between the 5.6 kPa and the atmospheric pressure (100 kPa), pressure-raising units of two species are used as in the example illustrated in FIG. 2 (the steam compressor 37 and the carbon dioxide recovery pump 27). The power for compressing a gas is in proportion to the volume thereof; as described above, from a relationship between the amount of steam and that of carbon dioxide, steam is required in a volume 1.8 times that of carbon dioxide. Thus, in order to recover carbon dioxide in an amount equal to the amount of steam, the amount of energy consumption is made smaller in the use of compressed carbon dioxide than in that of compressed steam.

The description is made about an appropriate regeneration temperature (=the temperature and pressure of recovered steam) herein. The temperature of an adsorbent is raised by the adsorption heat generated when carbon dioxide is adsorbed to the adsorbent. The degree of the raise is in proportion to the concentration of carbon dioxide. In a thermal power station, the carbon dioxide concentration in a combustion exhaust gas is from 10 to 15%. In this case, the temperature of the adsorbent reaches into the range of 50 to 60° C. Since carbon dioxide is adsorbed/desorbed just after the adsorption of carbon dioxide, the consumed calorie becomes smaller as the regeneration temperature is closer to the adsorption temperature. For example, when the temperature of the adsorbent is 60° C. after adsorption to the adsorbent while the steam temperature is 80° C., energy for raising the temperature of the adsorbent by 20° C. is required. Thus, the present system is lowered in energy efficiency. Reversely, when the steam temperature is 40° C., steam penetrates the adsorbent layer without being condensed in the regeneration process so that the system is lowered in energy efficiency. The adsorbent temperature after adsorption to the adsorbent is dependent on the exhaust gas temperature and the carbon dioxide concentration as described above, so as to be varied in accordance with the used plant; thus, the regeneration temperature in the invention cannot be specified without reservation. The temperature ranges preferably from 40 to 90° C., more preferably from 50 to 70° C. to make the COP high. The temperature is most suitably about 60° C.

Figure 3:
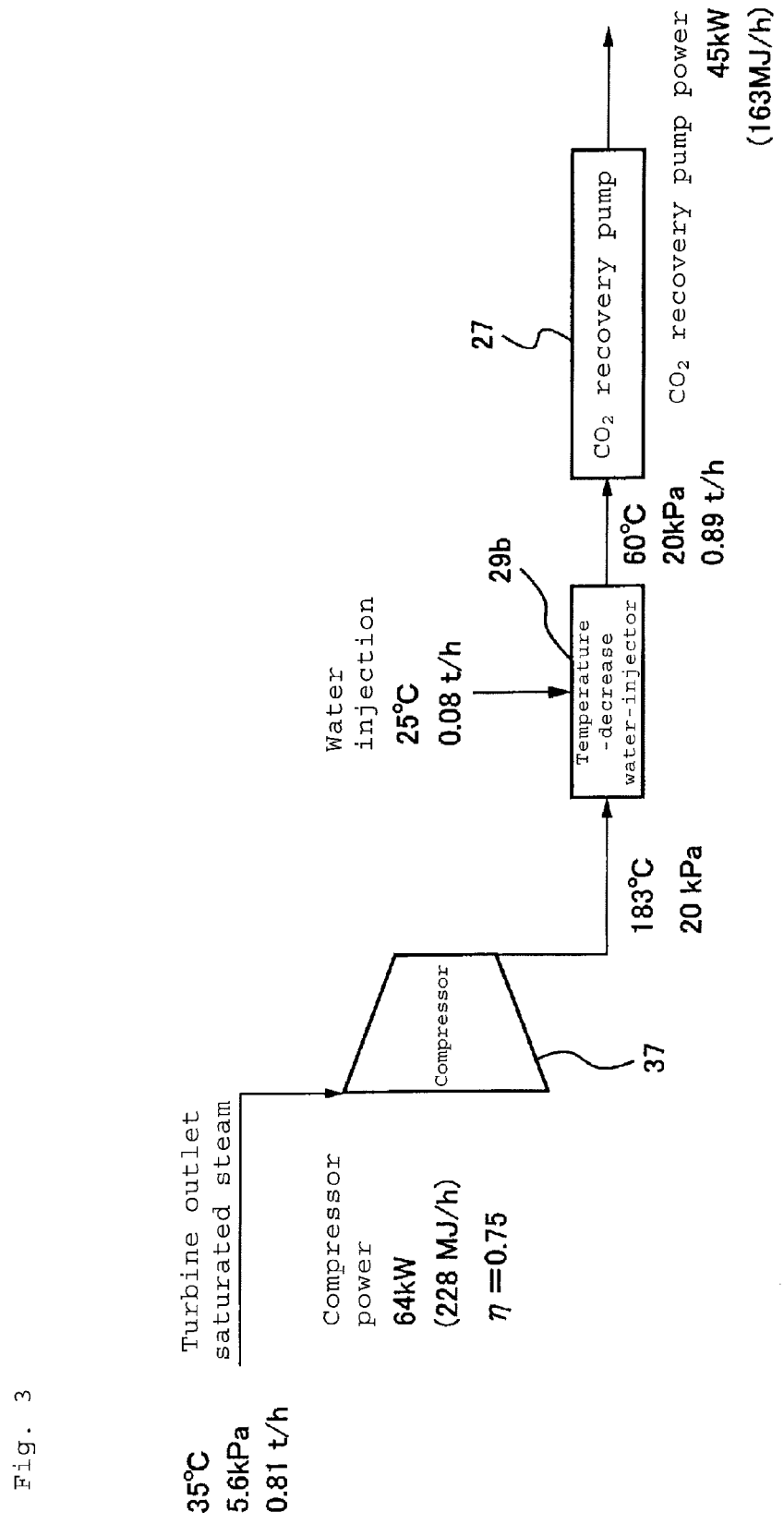
FIG. 3 is a schematic chart showing an energy balance when a temperature-decrease water-injector is used as a cooling device in the $CO_2$ recovery apparatus in FIG. 1.

FIG. 3 is an explanatory chart showing an energy balance in the recovery of carbon dioxide when a temperature-decrease water-injector 29b is used instead of the heat exchanger 29a in FIG. 2. FIG. 3 also demonstrates a case where carbon dioxide is recovered at 1 t/h. In the temperature-decrease water-injector 29b, water having normal temperature is injected to overheated steam which has been compressed/raised in temperature in the steam compressor 37, so that saturated steam having a predetermined temperature is generated. When the temperature-decrease water-injector 29b is used, finally obtained saturated steam of 60° C. in temperature is prepared from both of the overheated steam, which has been compressed/raised in temperature in the steam compressor 37, and water injected in the temperature-decrease water-injector 29b. Thus, the amount of steam taken out from the steam turbine 4 is 0.81 t/h, which is smaller than 0.89 t/h in the case shown in FIG. 2. The difference therebetween, 0.08 t/h, is the amount of the injected water in the temperature-decrease water-injector 29b. Accordingly, the power of the compressor in the steam compressor 37 is also smaller than 69 kW in the case shown in FIG. 2, that is, 63 kW. In the case shown in FIG. 3 also, after steam is compressed in the steam compressor 37, the resultant steam is overheated steam of 183° C. in temperature and 20 kPa in pressure. By injecting water to this overheated steam in the temperature-decrease water-injector 29b, saturated steam of 60° C. in temperature and 20 kPa in pressure is obtained as steam for desorption in the same manner as in FIG. 2. The supply amount thereof is equal to that in FIG. 2, that is, 0.89 t/h. In the same manner as in the case shown in FIG. 2, the power of the carbon dioxide recovery pump 27 is 45 kW, the pump being a pump for taking out desorbed carbon dioxide as a gas having normal pressure from the adsorbent-filled tower 21 or 31 under a reduced pressure.

In the above-mentioned case, saturated steam of 60° C. in temperature and 20 kPa in pressure is used as the steam for desorbing carbon dioxide. It is supposed that when the temperature and the pressure of saturated steam as steam for desorption are changed, the COP (heat recovery rate) is changed. Table 1 shows how the COP is changed when the temperature and the pressure of steam for desorption are changed. In Table 1, the first row describes the temperature of steam for desorption (saturated steam) that is to be obtained, and the second row "Recovery pump power" represents the power of the carbon dioxide recovery pump 27. The third row "Steam compression power" represents the power of the used. According to the results in Table 1, the temperature of steam for desorption ranges preferably from 40 to 90° C. (saturated steam having a pressure of 7 to 70 kPa), more preferably from 50 to 70° C. (saturated steam having a pressure of 12 to 30 kPa).

TABLE 1

Boiler steam recovery effect

| | | | | | | | | | | | | |
|---|---|---|---|---|---|---|---|---|---|---|---|---|
| Temperature of steam for desorption | ° C. | 35 | 40 | 50 | 60 | 70 | 80 | 90 | 100 | 110 | 120 | 130 |
| Recovery pump power | kW | 85 | 76 | 59 | 45 | 32 | 20 | 10 | 0 | 0 | 0 | 0 |
| Steam compression power | kW | 0 | 13 | 38 | 63 | 89 | 114 | 138 | 162 | 185 | 208 | 231 |
| Flow rate of used steam | t/h | 0.87 | 0.86 | 0.83 | 0.81 | 0.79 | 0.77 | 0.75 | 0.74 | 0.72 | 0.70 | 0.69 |
| Flow rate of injected steam | t/h | 0 | 0.02 | 0.05 | 0.08 | 0.11 | 0.14 | 0.17 | 0.20 | 0.22 | 0.25 | 0.28 |
| Flow rate [2] of steam for desorption | t/h | 0.87 | 0.87 | 0.88 | 0.89 | 0.90 | 0.91 | 0.92 | 0.93 | 0.94 | 0.95 | 0.97 |
| Necessary power [1] | kW | 85 | 89 | 97 | 108 | 121 | 134 | 148 | 162 | 185 | 208 | 231 |
| (in terms of calorie) | $GJ/t\_CO_2$ | 0.31 | 0.32 | 0.35 | 0.39 | 0.43 | 0.48 | 0.53 | 0.58 | 0.67 | 0.75 | 0.83 |
| COP | — | 2.7 | 2.6 | 2.4 | 2.2 | 1.9 | 1.7 | 1.6 | 1.4 | 1.3 | 1.1 | 1.0 |

[1] "Necessary power" = "Steam compressor power" + "Recovery pump power"

[2] "Flow rate of steam for desorption" = "Flow rate of used steam" + "Flow rate of injected steam"

(3) $\text{"COP"} = \dfrac{\dfrac{\text{"Flow rate of steam for desorption"} \times 10^3}{3600} \times \text{"Vaporization latent heat"} \times 0.4*}{\text{"Necessary power"}}$

* The power generation efficiency in terms of primary energy was set to 40%.

steam compressor 37. The total of the "Recovery pump power" and the "Steam compression power" is described in the row "Necessary power" together with the numerical value calculated in terms of calorie. The fourth row "Flow rate of used steam" is the flow rate of saturated steam introduced from the steam turbine 4 to the steam compressor 37. The fifth row "Flow rate of injected steam" is the flow rate of water injected in the temperature-decrease water-injector 29b. Accordingly, the sixth row "Flow rate of steam for desorption" is the total of the "Flow rate of used steam" and the "Flow rate of injected steam". The lowest row "COP" represents what amount of steam for desorption can be obtained relatively to the applied power (the power of the steam compressor 37 and that of the carbon dioxide recovery pump 27). A case where the "Temperature of steam for desorption" in Table 1 is 60° C. corresponds to FIG. 3. The COP in the case shown in FIG. 3 is 2.2.

It is understood from Table 1 that as the temperature of steam for desorption becomes lower, the COP becomes higher. However, the desorption rate of carbon dioxide tends to become small at low temperature. Thus, it is not preferred to lower the temperature excessively. It is also understood that as the temperature of steam for desorption becomes higher, the COP becomes smaller so that a larger energy is required for gaining the steam for desorption. As the temperature of steam for desorption becomes higher, the amine is unfavorably more easily deteriorated. The COP is 1, in particular, at 130° C. Thus, it cannot be said that the steam is effectually As described above, in the embodiments illustrated in FIGS. 2 and 3, waste steam that has not yet been introduced into the condenser 6, which is not used in any conventional power generation plant 1, is compressed/raised in temperature at a relatively low compression ratio, and then the resultant steam is used. Thus, even if power is consumed by the steam compressor 37 and the carbon dioxide recovery pump 27, carbon dioxide can be desorbed and recovered by energy lower than the energy in the prior art. The load of condensation in the condenser 6 of the power generation plant 1 is also decreased so that the amount of cooling-water in the cooling tower 13 is also reduced.

Table 2 shows a comparison in calorie required for separating and recovering carbon dioxide between in a $CO_2$ recovery apparatus in the prior art, and in a $CO_2$ recovery apparatus of the invention. In the precedent technique (MEA absorption method) described in Nonpatent Literature 1, main power is unnecessary; however, steam for power generation is partially bled. Thus, it is understood that steam energy is largely lost. The steam consumption amount may be improved by developing a new absorbing liquid. However, steam for power generation is partially bled; thus, it is understood that for the partial bleeding, the steam energy loss is not made small. Against this, in the $CO_2$ recovery apparatus of the present embodiment, the steam that has been discharged from the steam turbine 4 but has not yet been introduced into the condenser 6, which has not been used so far, is used to prepare steam for desorption. It is therefore understood that a large energy reduction is attained although the power for compression/raise in temperature up to 60° C. is required.

TABLE 2

Comparison between calories (unit: GJ/t_CO$_2$) required for CO$_2$ separation and recovery

|  | Conventional method | The present invention |
|---|---|---|
| CO$_2$ separation manner | MEA absorption method (*1) | Adsorption method |
| CO$_2$ recovery method | 120° C. heating regeneration | 60° C. steam regeneration |
| Regenerated energy |  |  |
| (1) Heated steam | 4.00 | 0.00 |
| (2) Consumed electric power | 0.00 | 0.97 (=108 kW/t_CO$_2$) (*2) |
| (Total) | 4.00 | 0.97 |

Figure 4:
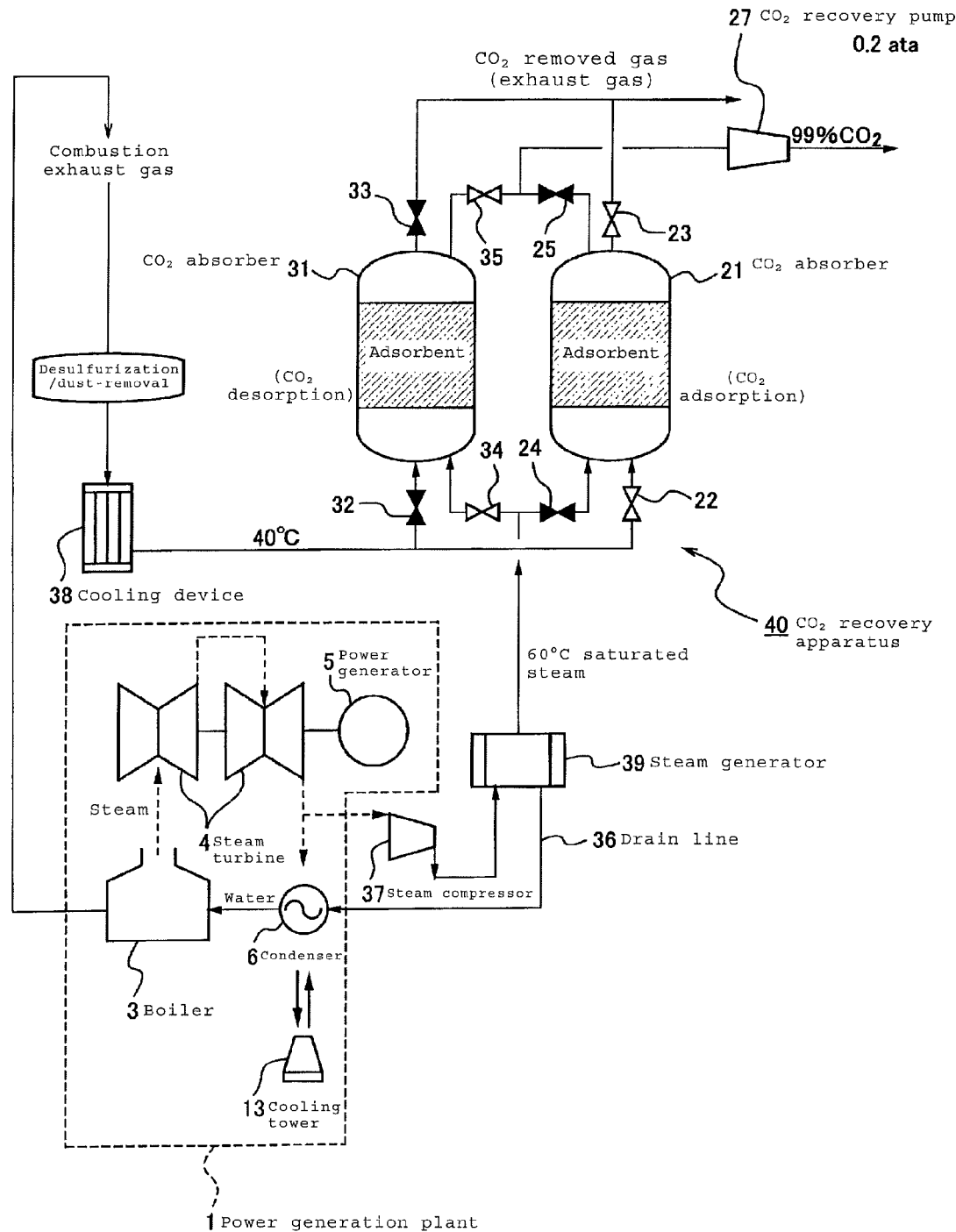
FIG. 4 is a schematic structural view of a $CO_2$ recovery apparatus according to another embodiment of the invention, and a power generation plant.

(*1) Nonpatent Literature 1: Report of Juridical Foundation of Research Institute of Innovative Technology for the Earth "Carbon Dioxide Separation and Recovery Technique Development by Utilizing Low-grade Waste Heat"
(*2) Necessary power at a regeneration temperature of 60° C., which is shown in Table 1, is described; about consumed electric power in terms of calorie, values each calculated in terms of calorie by use of a power generation efficiency of 40% are shown; consumed electric power in item (2) = 108 kw × 3600 seconds/10$^6$/40% = 0.97 GJ/t_CO$_2$ FIG. 4 illustrates a schematic structure of a CO$_2$ recovery apparatus 40 according to another embodiment of the invention, and a power generation plant 1. The present embodiment is different from the embodiment illustrated in FIG. 1 in that a steam generator 39 is used instead of the cooling device 29, and a drain line 36 is laid out to return steam generated in the steam generator 39 to a condenser 6. The other points are the same as in the embodiment in FIG. 1. Accordingly, in FIG. 4, the same reference signs as in FIG. 1 are attached to constituent elements corresponding to those in FIG. 1, respectively.

In the present embodiment, saturated steam that has been discharged from a steam turbine 4 but has not yet been introduced into the condenser 6 is compressed by a steam compressor 37 in the same way as in the embodiment in FIG. 1, so that overheated steam is obtained. Next, this overheated steam is introduced as a heat medium into the steam generator 39, and from water, steam for desorption that is saturated steam of 60° C. in temperature is prepared by heat exchange therebetween. In the same manner as in the embodiment in FIG. 1, this steam for desorption is supplied into an adsorbent-filled tower 21 or 31 to be used for the desorption of carbon dioxide. The overheated steam used to prepare the steam for desorption is lowered in temperature to be finally returned as drainage through the drain line 36 into the condenser 6.

In the present embodiment, saturated steam sent into the steam compressor 37 before introduced into the condenser 6 is used to prepare steam for desorption. Thereafter, the steam is entirely returned through the drain line 36 into the condenser 6. Accordingly, carbon dioxide can be desorbed and recovered without giving any bad effect to the power generation plant 1. Reversely, about water to be returned through the drain line 36 into the condenser 6 of the power generation plant 1, heat is already lost. Thus, the load of condensation in the condenser 6 is also decreased so that the amount of cooling-water in a cooling tower 13 is also reduced. In the embodiment also, outlet steam from the steam turbine 4 that has not yet been introduced into the condenser 6, which is not used in any conventional power generation plant 1, is compressed/raised in temperature at a relatively low compression ratio, and then the resultant steam is used. Thus, even if power is consumed by the steam compressor 37 and a carbon dioxide recovery pump 27, carbon dioxide can be desorbed and recovered by energy lower than the energy in the prior art.

Figure 6:
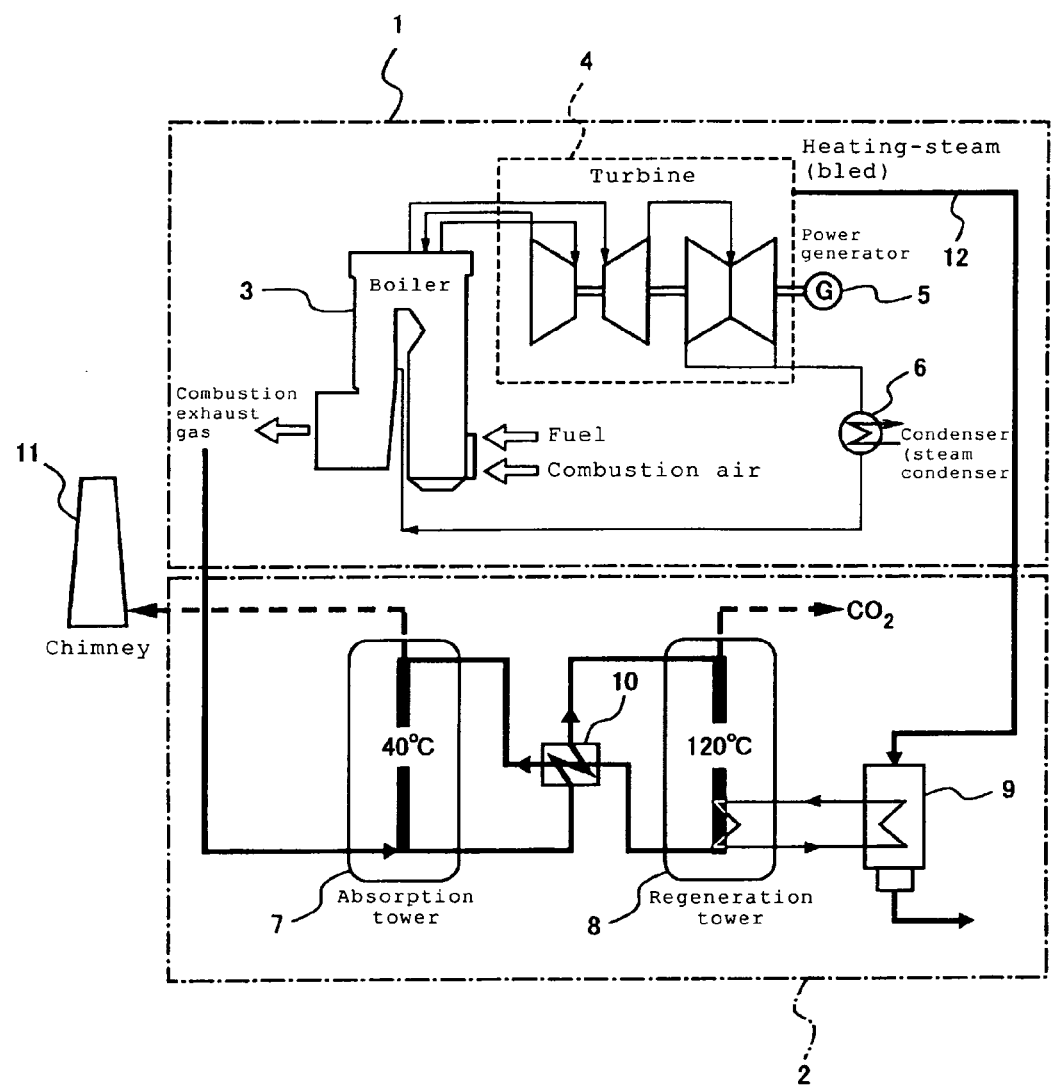
FIG. 6 is a schematic structural view illustrating a power generation plant, and a conventional $CO_2$ recovery apparatus installed together therewith.

Concerning each of the embodiments, the description has been made mainly about the case where an amine-supported adsorbent is used as a carbon dioxide adsorbent. The invention is however applicable in the same way to a case where an amine-absorbing liquid is used as a carbon dioxide adsorbent. In this case, in the structure in the prior art that is illustrated in FIG. 6, in which the aqueous amine solution absorbed in the absorption tower 7 is sent to the regeneration tower 8, and from the top of the regeneration tower 8 carbon dioxide is separated and recovered, outlet steam discharged from the outlet of the steam turbine is partially branched before introduced into the condenser 6, and this partially branched steam is compressed/raised in temperature and then supplied to the heat exchanger 9. By operating the regeneration tank 8 under a negative pressure, carbon dioxide can be separated from the aqueous amine solution, and recovered through a carbon dioxide recovery pump set up above the regeneration tank 8.

Concerning each of the embodiments, the description has been made about the CO$_2$ recovery apparatus having two CO$_2$ absorbers. However, the invention is not limited thereto. Thus, the invention is applicable to a CO$_2$ recovery apparatus having three or more CO$_2$ absorbers.

INDUSTRIAL APPLICABILITY

According to the CO$_2$ recovery method and apparatus of the invention, carbon dioxide can be recovered with low energy consumption from a gas to be processed that is discharged from a power generation plant and that contains carbon dioxide. Thus, the invention is usable in the fields of thermal power generation, environment-protecting industries, and the like.

REFERENCE SIGNS LIST

1: Power generation plant
2: CO$_2$ recovery apparatus (amine absorption manner)
3: Boiler
4: Steam turbine
5: Power generator
6: Condenser (steam condenser)
7: Absorption tower
8: Regeneration tank
9: Heat exchanger
10: Heat exchanger
11: Chimney
12: Heating-steam bleeding line
13: Cooling tower
19: Carbon dioxide adsorbent
20: CO$_2$ recovery apparatus
21: CO$_2$ absorber
22: Valve
23: Valve
24: Valve
25: Valve
27: Carbon dioxide recovery pump
29: Cooling device
29a: Heat exchanger
29b: Temperature-decrease water-injector
31: CO2 absorber
32: Valve
33: Valve
34: Valve
35: Valve
36: Drain line
37: Steam compressor
38: Cooling device 39: Steam generator
40: $CO_2$ recovery apparatus

The invention claimed is:

1. A $CO_2$ recovery method, using a carbon dioxide adsorbent to adsorb and desorb carbon dioxide from a gas to be processed that is discharged from a power generation plant comprising a boiler and a steam turbine, and that contains carbon dioxide, comprising:

an adsorbing step of using the carbon dioxide adsorbent to adsorb carbon dioxide from the gas to be processed; and a desorbing step of using steam for desorption to desorb, from the carbon dioxide adsorbent which has adsorbed carbon dioxide, carbon dioxide, wherein the steam for desorption is saturated steam having a pressure of 7 to 70 kPa, which is prepared from overheated steam obtained by compressing a part of outlet steam discharged from an outlet of the steam turbine using a steam compressor.

2. The $CO_2$ recovery method according to claim 1, wherein the desorbing step is performed under a negative pressure.

3. The $CO_2$ recovery method according to claim 1, wherein the steam for desorption is steam prepared from water by heat exchange between the water and the overheated steam.

4. The $CO_2$ recovery method according to claim 1, wherein the steam for desorption is steam prepared by injecting water to the overheated steam.

5. The $CO_2$ recovery method according to claim 1, wherein the carbon dioxide adsorbent is an amine-supported adsorbent, and the steam for desorption is supplied from an end of the carbon dioxide adsorbent to a different end thereof, the method further comprising a controlling step of stopping the supply of the steam for desorption when the temperature of the different end of the carbon dioxide adsorbent reaches a predetermined temperature.

6. A $CO_2$ recovery apparatus, using a carbon dioxide adsorbent to adsorb and desorb carbon dioxide from a gas to be processed that is discharged from a power generation plant comprising a boiler and a steam turbine, and that contains carbon dioxide, comprising:

at least one $CO_2$ absorber filled with the carbon dioxide adsorbent;

a gas-to-be-processed supplying means for supplying the gas to be processed, which contains carbon dioxide, to the $CO_2$ absorber to cause carbon dioxide to be adsorbed to the carbon dioxide adsorbent;

a steam-for-desorption preparing means for preparing steam for desorption that is steam for desorbing carbon dioxide; and a steam-for-desorption supplying means for supplying the steam for desorption to the $CO_2$ absorber to desorb carbon dioxide from the carbon dioxide adsorbent, wherein the steam-for-desorption preparing means is a means for preparing, from overheated steam obtained by compressing a part of outlet steam discharged from an outlet of the steam turbine, the steam for desorption, which is saturated steam having a pressure of 7 to 70 kPa.

7. The $CO_2$ recovery apparatus according to claim 6, wherein the desorption of carbon dioxide from the carbon dioxide adsorbent by the use of the steam for desorption is performed under a negative pressure.

8. The $CO_2$ recovery apparatus according to claim 6, wherein the steam for desorption is prepared from water by heat exchange between the water and the overheated steam.

9. The $CO_2$ recovery apparatus according to claim 6, wherein the steam for desorption is steam prepared by injecting water to the overheated steam.

10. The $CO_2$ recovery apparatus according to claim 6, wherein the carbon dioxide adsorbent is an amine-supported adsorbent, and the steam-for-desorption supplying means supplies the steam for desorption from an end of the carbon dioxide adsorbent to a different end thereof, the apparatus further comprising controlling means for stopping the supply of the steam for desorption when the temperature of the different end of the carbon dioxide adsorbent reaches a predetermined temperature.

* * * * *